United States Patent [19]
Harrington, III et al.

[11] Patent Number: 6,166,822
[45] Date of Patent: Dec. 26, 2000

[54] METHOD OF PRINTING WITH A HOST BASED PRINTER USING AN INTERNAL FONT

[75] Inventors: Paul Harrington, III, Versailles; Randall David Mayo, Georgetown, both of Ky.

[73] Assignee: Lexmark International, Inc., Lexington, Ky.

[21] Appl. No.: 09/009,114

[22] Filed: Jan. 20, 1998

[51] Int. Cl.[7] .............................. B41B 15/00; B41J 15/00; G06F 15/00
[52] U.S. Cl. ............................................................ 358/1.13
[58] Field of Search .................................... 395/110, 112; 358/1.11, 1.13

[56] References Cited

U.S. PATENT DOCUMENTS

| | | | |
|---|---|---|---|
| 4,179,732 | 12/1979 | Khan et al. | 364/200 |
| 4,462,701 | 7/1984 | Czyszczewski et al. | 400/3 |
| 5,001,653 | 3/1991 | Buchanan et al. | 395/102 |
| 5,270,774 | 12/1993 | Kikuchi | 355/203 |
| 5,412,761 | 5/1995 | Teradaira | 395/111 |
| 5,446,832 | 8/1995 | Higuchi | 395/113 |
| 5,455,895 | 10/1995 | Hattori | 395/112 |
| 5,467,435 | 11/1995 | Douglas et al. | 358/1.15 |
| 5,469,532 | 11/1995 | Gerlach et al. | 395/102 |
| 5,481,742 | 1/1996 | Worley et al. | 395/800 |
| 5,509,107 | 4/1996 | Kojima | 395/113 |
| 5,586,229 | 12/1996 | Kim et al. | 395/116 |
| 5,659,669 | 8/1997 | Narukawa et al. | 395/102 |
| 5,706,410 | 1/1998 | Bagley et al. | 395/112 |
| 5,903,716 | 5/1999 | Kimber et al. | 395/114 |

*Primary Examiner*—Joseph Mancuso
*Assistant Examiner*—F. E. Cooperrider
*Attorney, Agent, or Firm*—Jacqueline Daspit; Ronald K. Aust

[57] ABSTRACT

A method of printing a print image on a print medium using a printer includes providing a text printing mode, wherein a first predetermined number of bits identify a selected character to be printed. A host based printing mode is provided wherein selected bits each indicate whether a corresponding pixel should be printed. The printer is initialized to print in either one of the text printing mode and the host based printing mode. A second predetermined number of bits of a data stream associated with the print image to be printed are received within the printer. The second predetermined number of bits is examined to determine a presence of a command therein. The printer is enabled to print in an enabled printing mode. The enabled printing mode includes either the text printing mode or the host based printing mode, dependent upon the examination of the second predetermined number of bits. The printer is used to print on the print medium in the enabled printing mode.

8 Claims, 6 Drawing Sheets

| 04D | 04D | 0 | 0 | 0 | 0 | 0 | 0 | 013 | 013 | 1 | 1 | 1 | 1 | 1 | 1 | 12C | 12C |
|---|---|---|---|---|---|---|---|---|---|---|---|---|---|---|---|---|---|
| 04D | 04D | 0 | 0 | 0 | 0 | 0 | 0 | 013 | 013 | 1 | 1 | 1 | 1 | 1 | 1 | 12C | 12C |
| 4D | 4D | | | | | | | 3 | 3 | | | | | | | 2C | 2C |
| 4 | 4 | D | D | | | | | 3 | 3 | | | | | C | C | 2 | 2 |
| 4 | 4 | D | D | | | | | 3 | 3 | | | | | C | C | 2 | 2 |
| 4 | 4 | D | D | | | | | 3 | 3 | | | | | C | C | 2 | 2 |
| 4 | 4 | | | D | D | | | 3 | 3 | | | | C | C | | 2 | 2 |
| 4 | 4 | | | D | D | | | 3 | 3 | | | | C | C | | 2 | 2 |
| 4 | 4 | | | D | D | | | 3 | 3 | | | | C | C | | 2 | 2 |
| 4 | 4 | | | | | D | D | 3 | 3 | C | C | | | | | 2 | 2 |
| 4 | 4 | | | | | D | D | 3 | 3 | C | C | | | | | 2 | 2 |
| 4 | 4 | | | | | D | D | 3 | 3 | C | C | | | | | 2 | 2 |
| 469 | 469 | 6 | 6 | 6 | 6 | 6 | 6 | 3568CDEF | 3568CDEF | 5 | 5 | 5 | 5 | 5 | 5 | 257 | 257 |
| 469 | 469 | 6 | 6 | 6 | 6 | 6 | 6 | 3568CDEF | 3568CDEF | 5 | 5 | 5 | 5 | 5 | 5 | 257 | 257 |
| 9 | 9 | | | | | E | E | 8 | 8 | F | F | | | | | 7 | 7 |
| 9 | 9 | | | | | E | E | 8 | 8 | F | F | | | | | 7 | 7 |
| 9 | 9 | | | | | E | E | 8 | 8 | F | F | | | | | 7 | 7 |
| 9 | 9 | | | | E | E | | 8 | 8 | | | | F | F | | 7 | 7 |
| 9 | 9 | | | | E | E | | 8 | 8 | | | | F | F | | 7 | 7 |
| 9 | 9 | | | | E | E | | 8 | 8 | | | | F | F | | 7 | 7 |
| 9 | 9 | | E | E | | | | 8 | 8 | | | | | F | F | 7 | 7 |
| 9 | 9 | | E | E | | | | 8 | 8 | | | | | F | F | 7 | 7 |
| 9 | 9 | | E | E | | | | 8 | 8 | | | | | F | F | 7 | 7 |
| 9E | 9E | | | | | | | 8 | 8 | | | | | | | 7F | 7F |
| 9BE | 9BE | B | B | B | B | B | B | 8AB | 8AB | A | A | A | A | A | A | 7AF | 7AF |
| 9BE | 9BE | B | B | B | B | B | B | 8AB | 8AB | A | A | A | A | A | A | 7AF | 7AF |

Fig. 3

METHOD OF PRINTING WITH A HOST BASED PRINTER USING AN INTERNAL FONT

BACKGROUND OF THE INVENTION

1. Field of the Invention

The present invention relates to host based printers, and, more particularly, to a method of printing with a host based printer using an internal font.

2. Description of the Related Art

A host based printer is designed to allow the host system to which it is attached to do much of the data processing functions that were historically performed in the printer itself. These functions included parsing of data, font image storage, font image manipulation, along with other tasks. By moving these functions into the system to which the printer is attached, the printer may be designed to be less expensive. The savings come from reduced Read Only Memory (ROM), Random Access Memory (RAM), and processing power requirements.

A host based printer may be designed such that the printer is not capable of printing anything without the necessary software running in the host system. A problem is that the printer cannot perform stand alone printing for demonstration, printer maintenance purposes, or host system maintenance in the case that the host software cannot be loaded or for whatever reason will not function properly. Accordingly, ASCII text files such as configuration and batch files cannot be printed if the host software is not functioning.

What is needed in the art is a method of printing text in a rudimentary fashion that allows a host based printer to print printer maintenance data and system configuration files without assistance from the host, and without requiring large amounts of ROM for the storage of font data, RAM for font manipulation, or processing power for handling the font data.

SUMMARY OF THE INVENTION

The present invention provides a method of printing diagnostics and internal test results in a rudimentary fashion with a host based printer, without an attached computer, and with a minimum of ROM, RAM and processing power within the host based printer. Safeguards are provided to terminate printing in the rudimentary printing mode if data which is not compatible with the rudimentary printing mode is received from the host by the printer.

The invention comprises, in one form thereof, a method of printing a print image on a print medium using a printer including the step of providing a text printing mode, wherein a first predetermined number of bits identify a selected character to be printed. A host based printing mode is provided wherein selected bits each indicate whether a corresponding pixel should be printed. The printer is initialized to enable each of the text printing mode and the host based printing mode. A second predetermined number of bits of a data stream associated with the print image to be printed are received within the printer. The second predetermined number of bits is examined to determine a presence of a command therein. Upon determining the presence of the command, the text printing mode is disabled. However, in the absence of the command, the text printing mode and the host based printing mode remain enabled. The printer is enabled to print in an enabled printing mode. The enabled printing mode includes one of the text printing mode or the host based printing mode. The printer is used to print on the print medium in the enabled printing mode.

An advantage of the present invention is that the host based printer can perform stand alone printing when the host software is not functioning.

Another advantage is that the host based printer can perform stand alone printing with a minimum of memory and processing power.

Yet another advantage is that printing in the stand alone mode is terminated if data which is not compatible with the rudimentary printing mode is received from the host by the printer.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a schematic illustration of one embodiment of an image matrix of the present invention;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
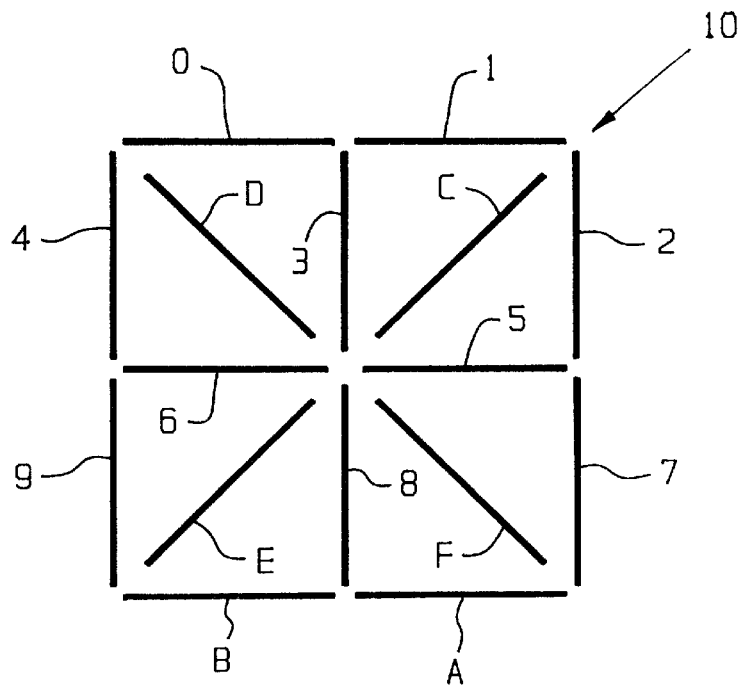
FIG. 1 is a schematic illustration of one embodiment of an internal font of the present invention showing sixteen line segments.

The present invention provides a method of enabling a printer to perform stand alone printing of alphanumeric characters, the characters each being formed by combining a subset of a set of line segments. Referring now to the drawings and more particularly to FIG. 1, there is shown a character box 10 including a set of sixteen predetermined line segments and associated segment identifiers 0–F. A correlated subset of the sixteen line segments is chosen to represent each of a set of alphanumeric characters. For example, the number "4" is represented by the correlated subset of line segments associated with segment identifiers 3, 4, 5, 6 and 8. These line segments are printed onto a print medium to form an image visually recognizable as the number "4." In one embodiment of the present invention, the set of alphanumeric characters includes twenty-six uppercase letters and ten digits. However, the set of alphanumeric characters can include any characters that are desired to be printed for a particular application. Similarly, character box 10 can be of a shape other than square and may include a lesser or greater number of line segments having orientations other than as shown.

Figure 2:
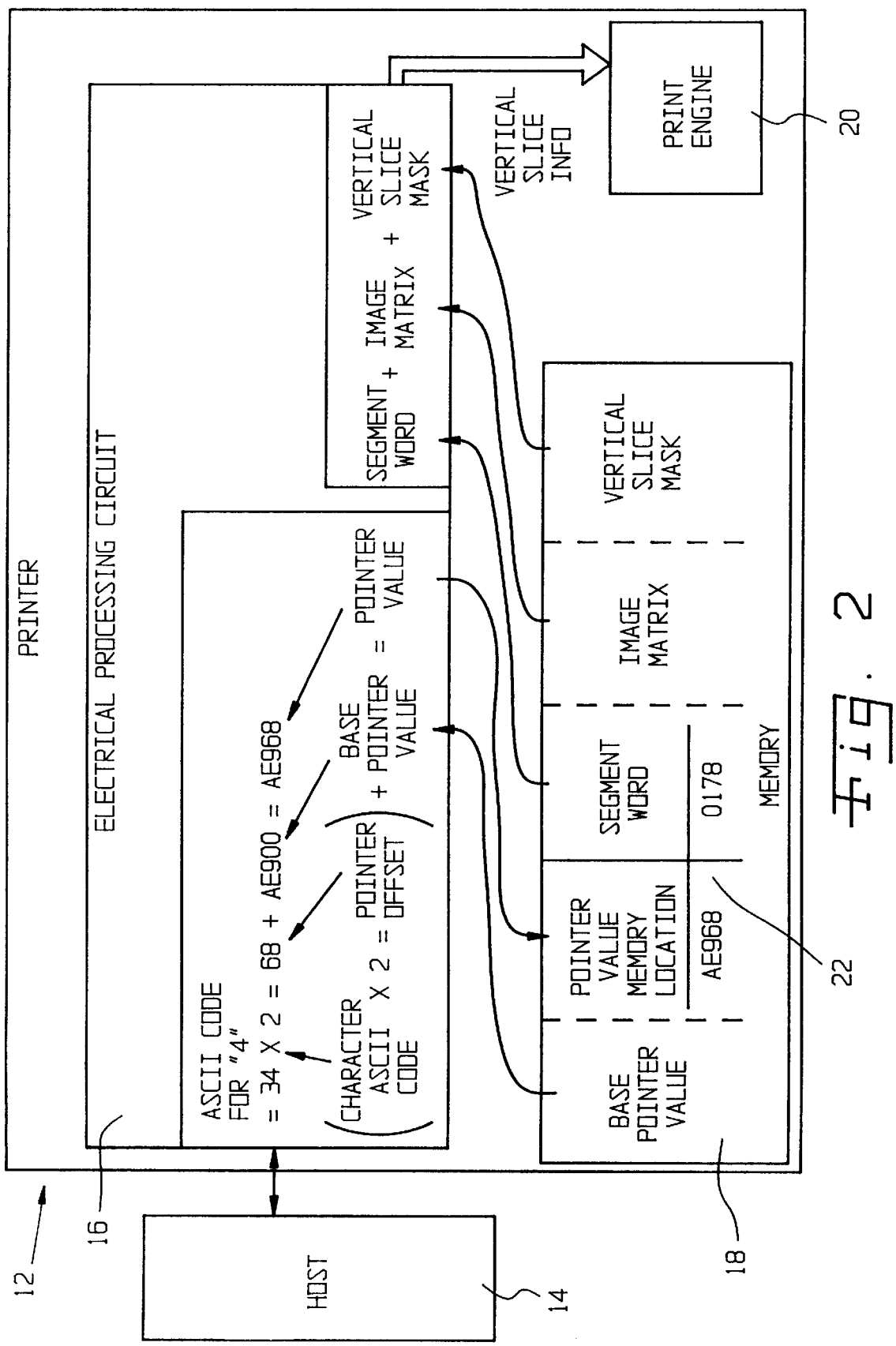
FIG. 2 is a block diagram of a host based printer connected to a host computer showing an embodiment of the data flow of the method of the present invention.

Referring now to FIG. 2, there is shown a schematic illustration of a host based printer 12 connected to a host computer 14. Printer 12 includes an electrical processing circuit (EPC) 16, a memory device 18 having both RAM and ROM, and a print engine 20. Where in this application the term "memory device" is used, it is to be understood that the term may include multiple memory elements. EPC 16 identifies a character to be printed, "4" in the example shown, and provides that character in a binary code format, 0011 0100 in binary ASCII character code, or 34 in hexadecimal ASCII as shown for purposes of illustration. EPC 16 provides the character to be printed in a binary ASCII character code in the embodiment shown. However, it is to be understood that the character can be provided in any binary code format. EPC 16 multiplies the ASCII code for "4", 34 hexadecimal, by two, for reasons which will be explained below, to generate a pointer offset, 68 hexadecimal.

A character segment lookup table 22 is stored in memory device 18. Character segment lookup table 22 provides a four digit hexadecimal or sixteen bit segment word in which each of the sixteen bits corresponds to one of the sixteen line segment identifiers 0–F. A unique segment word is provided in table 22 for each of the characters in the set of thirty-six alphanumeric characters that can be printed. The bits in the segment word that are set "high," or equal to "1," indicate which of the line segments are in the subset of segments that must be printed in order to form the desired character. The segment identifier-to-bit correspondence is FEDC BA98 7654 3210 in the embodiment shown. However, it is to be understood that the segments may correspond to the segment word bits in the opposite order or in any other arbitrary segment-to-bit assignment. The segment word for the character "4" is 0178 hexadecimal or 0000 0001 0111 1000 binary, corresponding to the character box line segments 3, 4, 5, 6 and 8, as discussed above. These segments can be printed to generate the character "4."

Each unique segment word is found in a particular corresponding pointer value memory location in table 22. The segment word 0178 for the character "4" is shown as being found in memory location AE968 in table 22. EPC 16 retrieves a constant base pointer value, AE900 in the example, from memory device 18. The base pointer value is a constant offset value in memory device 18 which points to a starting memory location for table 22. EPC then adds the pointer offset, 68 for the character "4" ASCII code, to the constant base pointer value, AE900, to arrive at the memory location pointer value, AE968. EPC 16 then finds the segment word 0178 for the character "4" in memory location AE968. Eight bits are stored in each memory location when using, e.g., the Motorola 68000 microprocessor, so each sixteen bit segment word must be stored in two memory locations. Hence, segment word 0000 0001 0111 1000 is stored in memory locations AE968 and AE969. Since the ASCII code increments by the value "one" from character to character, e.g., ASCII code for "4" is 34 hexadecimal and ASCII code for "5" is 35 hexadecimal, the ASCII code is multiplied by two to generate a pointer offset such that the beginning of each segment word is found in every other memory location. Thus, the pointer offset for the character "5" is 35 hexadecimal multiplied by two, or 6A, and the beginning of the segment word for the character "5" is found in pointer value memory location AE96A.

An image matrix 24 (FIG. 3) is also stored in memory device 18. Image matrix 24 includes a plurality of rows 26 and columns 28 of cells 30, with each cell 30 corresponding to a respective block of at least one dot or pixel location on the print medium. Each cell 30 of image matrix 24 may contain one or more segment identifiers 0–F. The cell locations of the segment identifiers relate to the locations of line segments 0–F in character box 10 (FIG. 1). For instance, if line segments 4 and 9 are in the subset of segments correlated to the character to be printed, then blocks of pixels corresponding to the entire two left-most columns 28L of cells 30 of image matrix 24 are printed. Image matrix 24 digitizes line segments 0–F into rows 26 and columns 28 of cells 30 corresponding to the pixel locations on the print medium.

Figure 4:
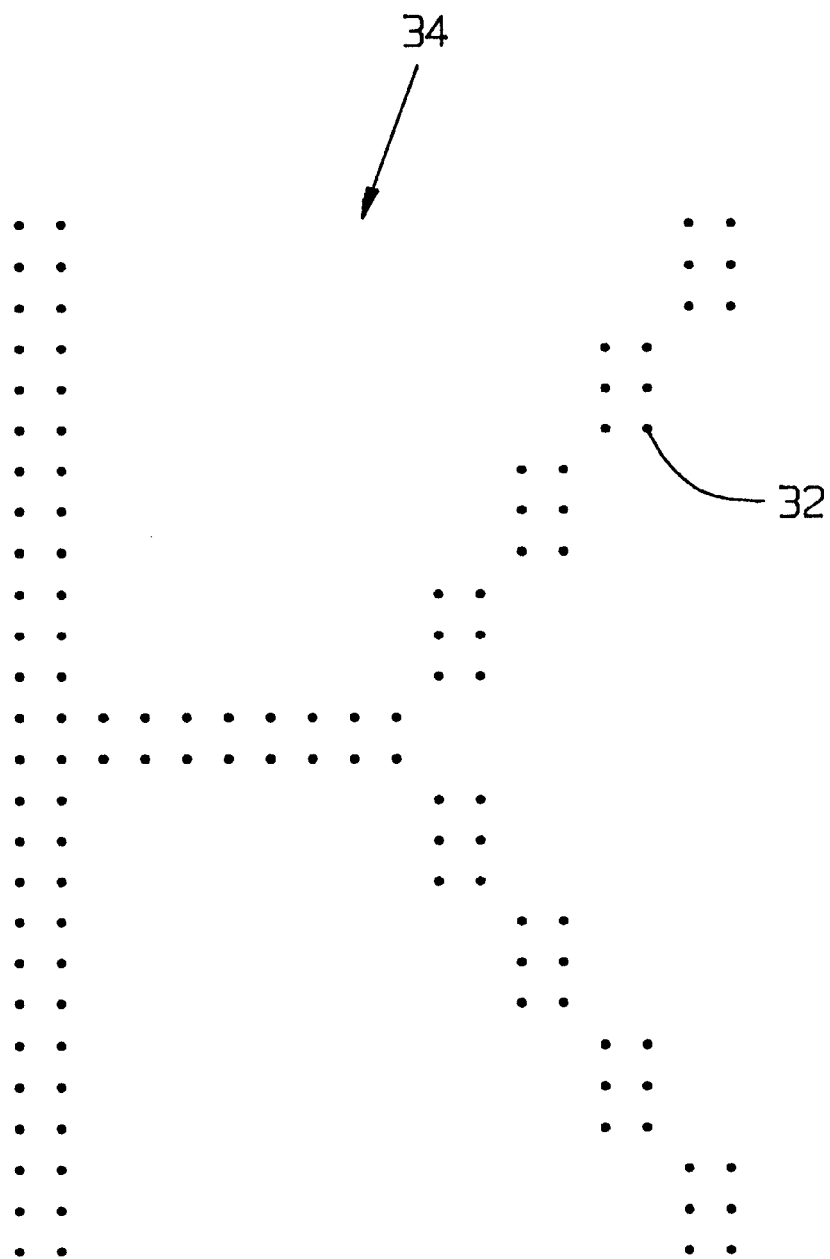
FIG. 4 is a schematic illustration of a capital letter "K" printed by the method of the present invention in which certain pixels corresponding to the cells of the image matrix of FIG. 3 are printed.

A character "K" printed by this method is shown in FIG. 4, wherein each cell 30 of image matrix 24 in FIG. 3 corresponds to only one pixel location 32 in a pixel matrix 34 having twenty-six rows and eighteen columns. A character "K" is formed by line segments 4, 6, 9, C and F, corresponding to a segment word 1001 0010 0101 0000 binary or 9250 hexadecimal.

Figure 5:
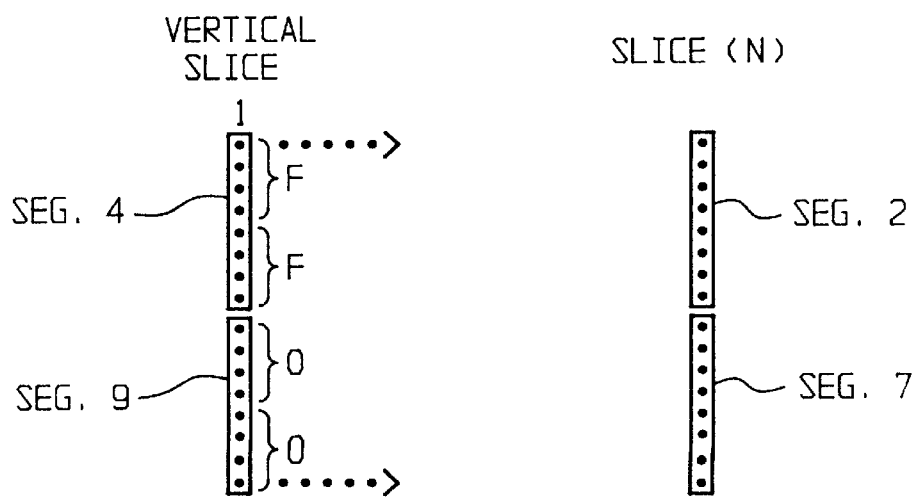
FIG. 5 is a schematic illustration of a vertical slice mask of the present invention.

Each line segment 0–F is associated in memory with a vertical slice mask as shown in FIG. 5, which assumes a pixel matrix having sixteen rows and N columns. EPC 16 combines a segment word, which indicates which segments 0–F are to be printed for a certain character, with the image matrix to send pixel information to print engine 20 in vertical slices, one column at a time, using the vertical slice technique of FIG. 5. A case in which segment 4 is in the subset of line segments correlated to the character to be printed, and in which segment 9 is not in the subset correlated to the character to be printed is shown in FIG. 5. EPC 16 sends a word value FF00 hexadecimal or 1111 1111 0000 0000 binary to print engine 20, each bit indicating the presence in an image matrix cell 30 of a segment identifier 0–F corresponding to the character to be printed. In other words, each bit in the word value indicates which of the sixteen pixels in vertical slice 1 are to be printed. EPC 16 continues to send vertical slice data to print engine 20, ending with slice N which completes the pixel matrix. Although a vertical slice mask is used in the embodiment shown, it is to be understood that a horizontal slice mask may also be used.

To increase readability, a very small amount of additional code can be added to create special characters, such as period, colon and semicolon, which cannot be printed using line segments 0–F.

Less memory is required by the method of the present invention because a vertical slice mask need only be stored for each of the sixteen line segments, subsets of which are combined together to form complete characters using logical "or" operations, rather than for each of the set of thirty-six characters that may be printed. Additionally, each segment takes much less memory to store than does a complete character. As an example of the memory requirements, assuming that each of twelve vertical and horizontal segments measures sixteen-by-two pixels, thirty-two bits or four bytes are required to store the segment. Each of four diagonal segments C, D, E and F require more memory to store, however, since all of the pixels in the intersection of the rows and columns spanned by each of the diagonal segments must be stored. For example, if a diagonal segment spans 16 rows by 10 columns of pixels 32, then 160 bits or 20 bytes are required to store the segment.

Sizes of image matrix 24 and pixel matrix 34 can each vary, e.g., from approximately 16 to 600 rows and from approximately 16 to 600 columns, depending upon the limitations of available memory and processing power and the required print quality. The relative sizes of image matrix 24 and pixel matrix 34 also determine the number of pixels 32 corresponding to a cell 30, pixel matrix 34 necessarily having as least as many rows and columns as image matrix 24. For instance, a 300 row by 300 column pixel matrix divided into a 150 row by 150 column image matrix would yield a two-by-two block of four pixels 32 per cell 30. A 600 row by 300 column pixel matrix divided into a 150 row by 100 column image matrix would yield a four row-by-three column block of twelve pixels 32 per cell 30. Pixel locations 32 corresponding to the same image matrix cell 30 will necessarily either all be printed or all not be printed since the same line segment identifiers 0–F in a cell 30 will apply to all pixels 32 corresponding to that cell.

The size of the pixel matrix varies with the print density of the printer. Printers with print densities of 1200 dots per inch are commonly in use. If the number of dots per inch printed by the printer is doubled, so too must the number of rows and columns in the pixel matrix be doubled in order to print the same size characters.

Not all pixel matrix rows and columns must necessarily be mapped into image matrix cells 30, however. For example, the top or first row of image matrix cells 30 may correspond to the ninth row of pixel matrix 34, with the top eight rows of pixel matrix 34 being unused. Similarly, a number of bottom rows or left most or right most columns of the pixel matrix may also not be mapped into the image matrix and thereby be left unused. This feature is particularly useful in that it allows the same character to be printed in different sizes. In one embodiment, alphabetic characters are printed in either full-size or half-size to create the effect of upper and lower case letters.

During use, in cases in which the host software has become unavailable for various reasons, it may be necessary to print error codes, diagnostics, internal test results, demonstration characters, printer maintenance information, or some other form of internally generated printer information. The method of the present invention allows a printer to perform such stand alone printing without assistance from the host computer.

It is possible for printer 12 to enter the above-described stand alone printing mode, hereinafter referred to as "text-printing," while host 14 continues to send data to printer 12 in a standard or proprietary data format, hereinafter referred to as "host based printing (HBP)." In such HBP printing, bits of data in the data stream generally correspond to a separate pixel to be printed. In the stand alone test printing mode described above, in contrast, each byte of data generally corresponds to an entire character. Consequently, if host 14 continues to send HBP printing data after printer 12 has entered the text-printing mode, it is possible for a small amount of HBP data to be printed by printer 12 in the form of many pages of random characters. This would result in a waste of large amounts of paper and ink if no human is present to stop the printing. For example, a printed 8-inch swath at 1200 dots per inch and 26 bytes per vertical slice can contain as much as 249,626 bytes of HBP printing data. A printer 12 in text-printing mode would convert each of these bytes into a separate character, resulting in as much as 48 pages of random characters. To prevent such a waste of resources, some safeguards are needed.

Figure 6:
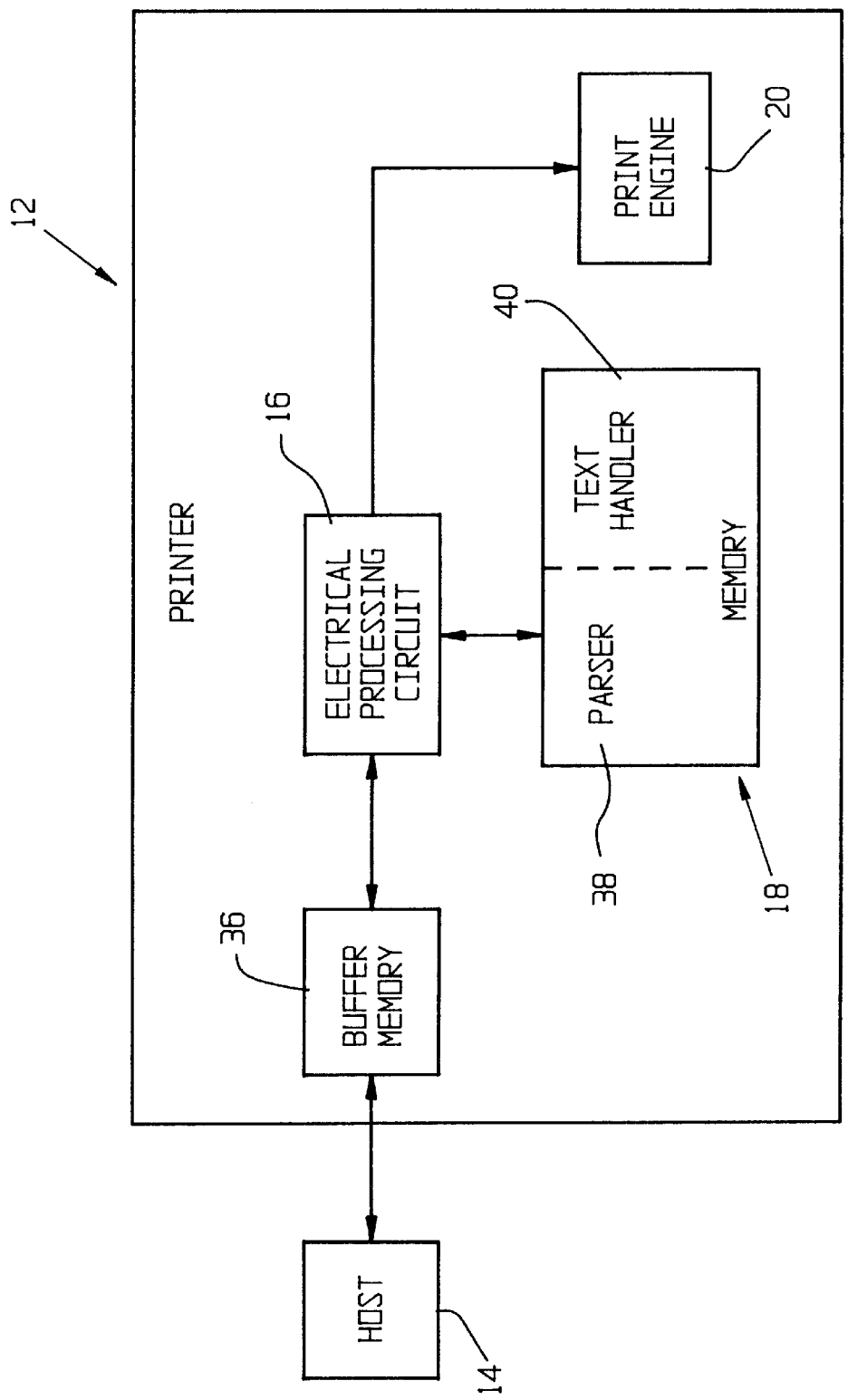
FIG. 6 is a simplified block diagram, similar to FIG. 2, of a host based printer connected to a host computer.

Referring now to FIG. 6, host 14 sends data to printer 12, wherein the data is stored in a buffer memory 36. Through EPC 16, a parser 38 in memory 18 retrieves a small amount of data, for example 1 or 2 bytes, out of buffer memory 36 for immediate processing. Text handler 40 of memory 18 corresponds to that which is shown to be in memory 18 in FIG. 2. Text handler 40 is activated when printer 12 is in text-printing mode.

Figure 7:
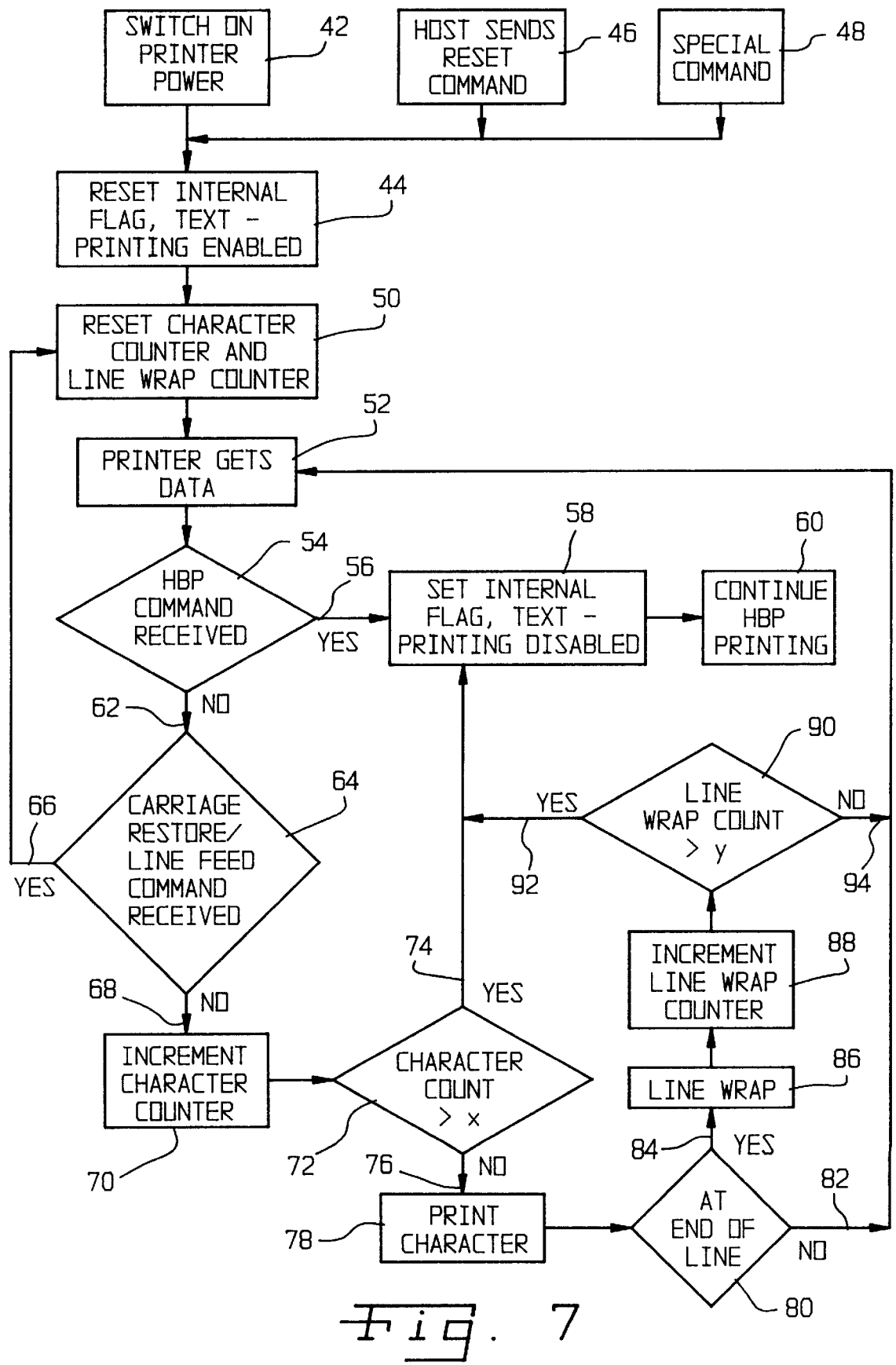
FIG. 7 is a flow diagram of an embodiment of safeguards used in the internal font printing mode of the present invention.

As shown in the flow diagram of FIG. 7, printer 12 can enable and enter the text-printing mode in several different ways. For example, when printer 12 is powered on (block 42), both the text printing mode and the HBP printing mode are enabled, and the text printing mode is entered. An internal flag within printer 12 is reset when printer 12 is switched on, enabling text-printing (block 44). A temporary loss of power may also be sufficient to reset the internal flag within printer 12, enabling text-printing.

Another way printer 12 can enter the text-printing mode is by host 14 sending a command to reset the internal flag within printer 12 (block 46). This may be desired when an operating system, which may include an HBP printer driver, is not functioning within host 14 and HBP printing is not possible. In this case, host 14 can print from its base operating system, e.g., DOS (disk operating system) while printer 12 is in the text-printing mode.

Yet another way in which printer 12 can enter the text-printing mode is by a special command (block 48). Such a special command can be produced, for example, by the user pressing a certain sequence of buttons on printer 12 when the user would like printer 12 to print diagnostic information.

Generally, to prevent printer 12 from printing in the text-printing mode while host 14 sends HBP data, host 14 sends an HBP command with the data. In HBP language, such an HBP command may take the form of the hexadecimal value 1B 2A, with 1B being an escape code. The HBP command identifies the accompanying data as HBP data and sets the internal flag within printer 12 in order to disable text-printing.

An HBP command can be sent with a predetermined amount of print data from host 14. For example, an HBP command can be associated with a swath of print data or an entire print job. Thus, the frequency of an HBP command within the data stream can be varied. The higher the frequency of HBP commands within the data stream, the less data in HBP format can be inadvertently printed in text-printing mode. This is because printer 12, if printing in the text-printing mode, will switch to HBP printing upon receiving an HBP command. Printer 12 recognizes an HBP command no matter where in the data stream the HBP command is located. However, it is not necessarily efficient to rely on a high frequency of HBP commands alone to prevent a waste of paper and ink, as the HBP commands can clutter or occupy space within the data stream which is needed to carry other information. If printer 12 loses synchronization with host 14, such as, for example, when printer 12 temporarily loses power while host 14 continues to send data, printer 12 will print HBP formatted data in text-printing mode until the next HBP command is received in the data stream. If the number of data bytes received before the next HBP command is significant, large amounts of paper and ink can still be wasted.

It is also possible for printer 12 to use other known methods of discerning between a normal data word in the data stream from host 14 intended as character/pixel information versus a data word intended to be a control/command word. For example, the method disclosed in U.S. Pat. No. 5,050,098 (Brown, III et al.) is incorporated herein by reference.

As a second safety measure, printer 12 counts the number of characters printed without a carriage restore/line feed command being received in the data stream. Such a carriage restore/line feed command instructs printer 12 to move or return the carriage to the left most point of printing, or left margin, and to advance down to the next line of printing. If more than, for example, 264 characters are consecutively received without a carriage restore/line feed command being received by printer 12, then text-printing is disabled and printing continues in HBP mode.

As a third safeguard, the number of forced line wraps without receiving a carriage restore/line feed command is also counted. Such a forced line wrap occurs when printer 12 has reached the right most point of printing, or right margin, but continues to receive print data. Printer 12, in this case, begins a new line of printing without receiving a command in the data stream to do so. If the number of consecutive forced line wraps exceeds, for example, 66 (approximately one page), then text-printing is disabled and HBP printing is continued.

More specifically, immediately after text-printing is enabled such as by, e.g., powering on printer 12, a character counter and line wrap counter are reset to 0 (block 50). Parser 38 of memory 18 then retrieves a parcel of data from buffer memory 36 (block 52). EPC 16 examines the parcel of data for the presence of an HBP command, indicating that the data which follows is in HBP format (decision block 54). If an HBP command is found in the data parcel (line 56), then printer 12 sets an internal flag disabling text-printing (block 58) and prints the following data in HBP printing mode (block 60). If, on the other hand, an HBP command is not found in the data parcel (line 62), then EPC 16 examines the data parcel for the presence of a carriage restore/line feed command (decision block 64). If a carriage restore/line feed is found in the data parcel (line 66), then the character counter and line wrap counter are both reset to 0 (block 50) and control passes back to block 50. If, however, a carriage restore/line feed is not present (line 68), then the character counter is incremented by the number of text-printing mode characters that are represented in the data parcel (block 70). EPC 16 then determines whether the value of the character counter exceeds a predetermined value (decision block 72), indicating that an excessive number of characters have been sent without an intervening carriage restore/line feed. If the character counter has exceeded the predetermined number (line 74), then printer 12 sets the internal flag disabling text-printing (block 58) and continues to print the data in HBP mode (block 60). On the other hand, if the character counter has not exceeded the predetermined number (line 76), then text handler 40 and EPC 16 process the data and send it to print engine 20 to be printed as a character (block 78). It is then determined whether the carriage of printer 12 is at the end of a line (decision block 80). If not (line 82), then parser 38 again retrieves another parcel of data from buffer memory 36 (block 52). If the end of a line has been reached (line 84), then printer 12 performs a forced line wrap on its carriage (block 86). In such a forced line wrap (block 86), the carriage is restored to the beginning of the next line without any command to do so being received in the data stream. A line wrap counter is incremented (block 88) after each forced line wrap (block 86). EPC 16 then determines whether the value of the line wrap counter exceeds another predetermined value (decision block 90), for example, 66. If the line wrap counter has exceeded the second predetermined value (line 92), then printer 12 sets its internal flag disabling text-printing (block 58) and printing continues in the HBP printing mode (block 60). However, if the value of the line wrap counter does not exceed the second predetermined value (line 94), then parser 38 once more retrieves a data parcel from buffer memory 36 (block 52).

Thus, once text-printing is enabled (block 44) either by switching the printer power on (block 42), by a host command (block 46), or by a special command (block 48), text-printing continues until one of three events occurs. These three events include an HBP command being received in the data stream, a predetermined number of characters being printed without an intervening carriage restore/line feed command being received, and a second predetermined number of forced line wraps being performed without an intervening carriage restore/line feed command being received. If any of these three conditions occurs, then printer 12 disables further text-printing and switches itself into the HBP printing mode until another event occurs which enables text-printing.

It is to be understood that any on of the three safeguards alone, or any two of the three, could possibly be used to prevent unintentional text-printing. Further, the values given for frequency of HBP commands, and the maximum values of the character counter and line wrap counter before text-printing is disabled can be modified to suit the particular application.

Although the present invention has been described with reference to preferred embodiments, those skilled in the art will recognize that changes may be made in form and detail without departing from the spirit and scope of the following claims.

What is claimed is:

1. A method of printing a print image on a print medium using a printer, said method comprising the steps of:

providing a text printing mode, wherein a first predetermined number of bits identify a selected character to be printed;

providing a host based printing mode, wherein a group of bits indicates whether a corresponding pixel should be printed, said group including at least one bit;

resetting an internal flag in the printer, initializing printing in said text printing mode;

receiving within the printer a second predetermined number of bits of a data stream associated with the print image to be printed;

examining said second predetermined number of bits to determine a presence of a command therein, wherein upon determining the presence of the command, said text printing mode is disabled and in the absence of the command, said text printing mode and said host based printing mode remain enabled;

enabling the printer to print in an enabled printing mode, said enabled printing mode comprising one of said text printing mode and said host based printing mode, said enabling step including switching the printer to said host based printing mode if said second predetermined number of bits include a command to print in said host based printing mode;

printing on the print medium using the printer in said enabled printing mode;

counting a number of characters printed without an intervening carriage restore/line feed in said data stream; and switching the printer to said host based printing mode if said number of characters printed without an intervening carriage restore/line feed exceeds a first predetermined value.

2. The method of claim 1, wherein said first predetermined value equals 264.

3. The method of claim 1, wherein said switching step includes setting said internal flag in the printer, thereby disabling printing in said text printing mode and enabling printing in said host based printing mode.

4. The method of claim 3, wherein the step of counting a number of characters includes the sub-steps of:

resetting a character counter; and incrementing said character counter.

5. A method of printing a print image on a print medium using a printer, said method comprising the steps of:

providing a text printing mode, wherein a first predetermined number of bits identify a selected character to be printed;

providing a host based printing mode, wherein a group of bits indicates whether a corresponding pixel should be printed, said group including at least one bit;

resetting an internal flag in the printer, initializing printing in said text printing mode;

receiving within the printer a second predetermined number of bits of a data stream associated with the print image to be printed;

examining said second predetermined number of bits to determine a presence of a command therein, wherein upon determining the presence of the command, said text printing mode is disabled and in the absence of the command, said text printing mode and said host based printing mode remain enabled;

enabling the printer to print in an enabled printing mode, said enabled printing mode comprising one of said text printing mode and said host based printing mode;

printing on the print medium using the printer in said enabled printing mode;

counting a number of forced line wraps without an intervening carriage restore/line feed in said data stream; and shifting the printer to said host based printing mode if said number of forced line wraps without an intervening carriage restore/line feed exceeds a second predetermined value.

6. The method of claim 5, wherein said second predetermined value equals 66.

7. The method of claim 5, wherein said shifting step includes setting said internal flag in the printer, thereby disabling printing in said text printing mode and enabling printing in said host based printing mode.

8. The method of claim 7, wherein the step of counting a number of forced line wraps includes the sub-steps of:

resetting a line wrap counter; and incrementing said line wrap counter.

* * * * *